Figure 1:
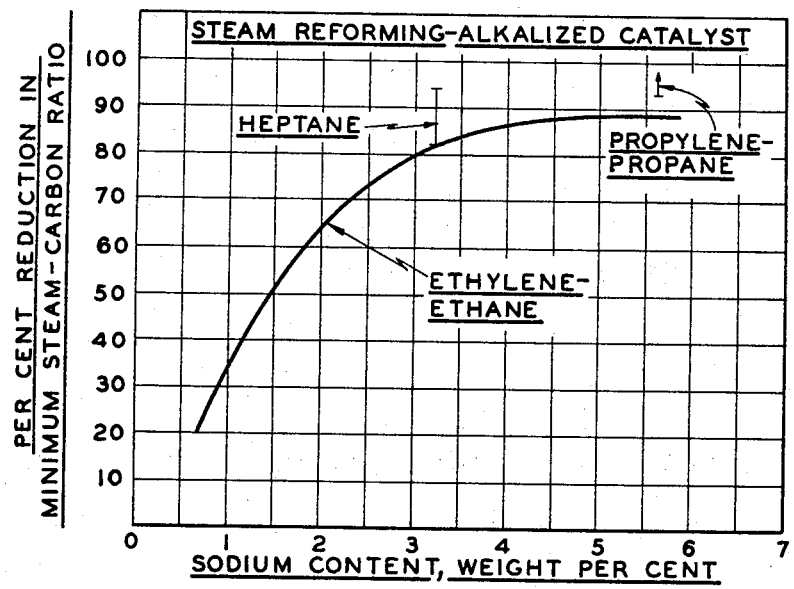

3,417,029
CATALYST COMPOSITION
Joseph F. McMahon, Iselin, N.J., assignor to Pullman Incorporated, a corporation of Delaware
Application Jan. 31, 1961, Ser. No. 86,045, now Patent No. 3,119,667, dated Jan. 28, 1964, which is a continuation-in-part of application Ser. No. 11,952, Mar. 1, 1960. Divided and this application Apr. 5, 1963, Ser. No. 270,892
14 Claims. (Cl. 252—455)

This application is a continuation-in-part of my prior and copending application Ser. No. 11,952, filed Mar. 1, 1960, now abandoned. This application is also a division of application Ser. No. 86,045, filed Jan. 31, 1961, which in turn is a continuation-in-part of application Ser. No. 11,952, filed Mar. 1, 1960, said application Ser. No. 86,045 now being U.S. Patent No. 3,119,667.

This invention relates to an improved contact material and process for the conversion of a hydrocarbon to a hydrogen-rich gas. In one aspect this invention relates to an improved process for converting hydrocarbons to hydogen-rich gas in the presence of steam. In a more particular aspect it relates to an improved catalyst and process for the steam reforming of hydrocarbons by which the amount of steam required to achieve carbon-free reforming is substantially lower than the amount required using conventional catalysts.

Hydrogen-rich gases including those containing carbon monoxide produced by steam reforming of hydrocarbons may be used in the Fischer-Tropsch process for the synthesis of hydrocarbons boiling in the gasoline range or oxygenated organic compounds such as alcohols and ketones. These gases may also be used in hydrogenation processes, in ammonia, methanol, or isobutanol synthesis, as well as for the reduction of metallic oxides and as fuel for domestic and industrial uses.

In recent years, the chemical industry has begun to show interest in refinery gases, coke oven gases and low molecular weight normally liquid hydrocarbons as potential catalytic steam reforming feedstocks. Unfortunately, however, the conditions used in the successful catalytic steam reforming of a feedstock containing methane as its predominant hydrocarbon constituent, such as natural gas, are wholly unsuitable to successful reforming of feedstocks containing significant amounts of hydrocarbons heavier than methane and olefins, such as the feedstocks discussed above. When conditions suitable to natural gas reforming are used with heavier or olefinic feedstocks, carbon is produced. The formation of carbon leads to coking of the catalyst, a severe reduction of catalyst activity and utility, and plugging of the catalyst bed and equipment. Such catalyst deactivation and plugging necessitates frequent interruption of the process in order to clean and recondition, making the process commercially unattractive.

In the manufacture of hydrogen by the reaction of hydrocarbons such as methane with steam at elevated temperatures, it is generally the practice to use catalytic masses containing nickel diluted wtih a refractory material such as alumina in various proportions. The higher the molecular weight of the hydrocarbon to be gasified, the greater is the degree of cracking of the hydrocarbon charge to carbon. One method for reducing carbon deposition and coking is to employ high steam to hydrocarbon ratios, which expedient is essential when normally liquid hydrocarbons are employed as the feedstock. However, as the steam requirements become more severe, the commercial feasibility of the process is lessened because of the cost of steam and considerations of operability. In addition to the drawback of high steam requirements, the prior art steam reforming catalysts generally are operable only with feedstocks which are substantially non-olefinic and sulfur-free.

It is, therefore, an object of this invention to provide a new and improved catalyst for the conversion of a hydrocarbon to hydrogen-rich gas.

Another object is to provide a new and improved catalyst for the conversion of a hydrocarbon to a hydrogen-rich gas in the presence of steam, the use of which permits a decrease in the minimum operable molar ratios of steam to hydrocarbon.

Another object of this invention is to provide an improved catalyst for the conversion of a normally liquid hydrocarbon including saturated and olefinic hydrocarbons and sulfur-containing feedstocks to a hydrogen-rich gas, which catalyst minimizes carbon formation.

Another object of this invention is to provide an improved catalyst for the carbon-free steam reforming of hydrocarbons above methane at steam requirements which are significantly lower than those required when standard catalysts are used.

A further object is to provide a process for the production of a hydrogen-rich gas by steam reforming of hydrocarbons in the presence of a particular catalyst, whereby carbon formation is substantially avoided and steam requirements are drastically reduced.

A further object is to provide a process for the steam reforming of normally liquid hydrocarbons including gas oil and naphtha boiling range hydrocarbons, which process is operable at relatively low steam to hydrocarbon ratios.

A still further object is to provide a method for the production of a catalyst having the above characteristics and advantages in steam reforming of hydrocarbons to hydrogen-rich gas.

Various other objects and advantages of this invention will become apparent to those skilled in the art from the accompanying description and disclosure.

The above objects are accomplished by contacting a hydrocarbon and steam in the presence of an alkalized catalyst comprising nickel and a refractory material under conditions such that hydrogen-rich gas is produced. Numerous advantages are realized by the use of the catalysts of this invention to effect conversion of hydrocarbons to hydrogen-rich gas in the presence of steam. One advantage is that steam reforming of hydrocarbons is accomplished at ratios of steam-to-hydrocarbon which are significantly lower than those required when standard steam reforming catalysts are employed. Even at these lower steam requirements, carbon deposition is substantially avoided. These advantages are particularly important when olefin-containing feeds, and normally liquid and heavy hydrocarbon feedstocks are employed, since steam reforming of such feedstocks is thereby rendered a commercially feasible process. Thus by the process of this invention, available and relatively inexpensive feedstocks which heretofore could not be used because of the necessity of using prohibitively high steam requirements are rendered useful for steam reforming. In addition, feedstocks currently employed may now be converted to hydrogen-rich gas at steam requirements which are significantly lower than those now employed, thereby improving the general economics of the process. The reduction of steam requirements is particularly marked and outstanding when the catalyst contains an added alkali metal compound.

The catalysts prepared and employed in accordance with the teachings of this invention contain nickel including elemental nickel or a compound of nickel such as nickel oxide, and mixtures thereof. The nickel content of the catalysts may range between about 4 and about 40 weight percent based on the total weight of the catalyst, the high nickel catalysts usually being preferred, such as, for example, those containing between about 10 and about 30 weight percent. A second ingredient of the catalyst is an added alkaline compound of which alkali metal compounds, including those of sodium, lithium and potassium, are preferred. Typical examples of such compounds are the alkali metal salts of an oxygen-containing acid such as the carbonates, bicarbonates, nitrates, sulfates, silicates, oxalates and acetates of sodium, potassium and lithium; the alkali metal oxides or an alkali metal salt capable of yielding the oxides at elevated temperatures including the aforesaid salts, as well as the alkali metal hydroxides. Particularly efficacious catalysts are those to which an alkali metal carbonate or hydroxide has been added, especially sodium carbonate and sodium hydroxide. The catalysts are prepared as so as to provide a concentration of added alkali of at least 0.5 weight percent calculated as the metal, preferably at least 2.0 weight percent. The concentration of added alkali may be as high as 30 weight percent, and usually an amount below 20 weight percent calculated as the metal, is employed.

FIGURE 1 of the accompanying drawing presents experimental data correlating percent reduction in the minmum steam-carbon ratio required for carbon-free steam reforming, with the concentration of added alkali in the catalysts of this invention.

Figure 2:
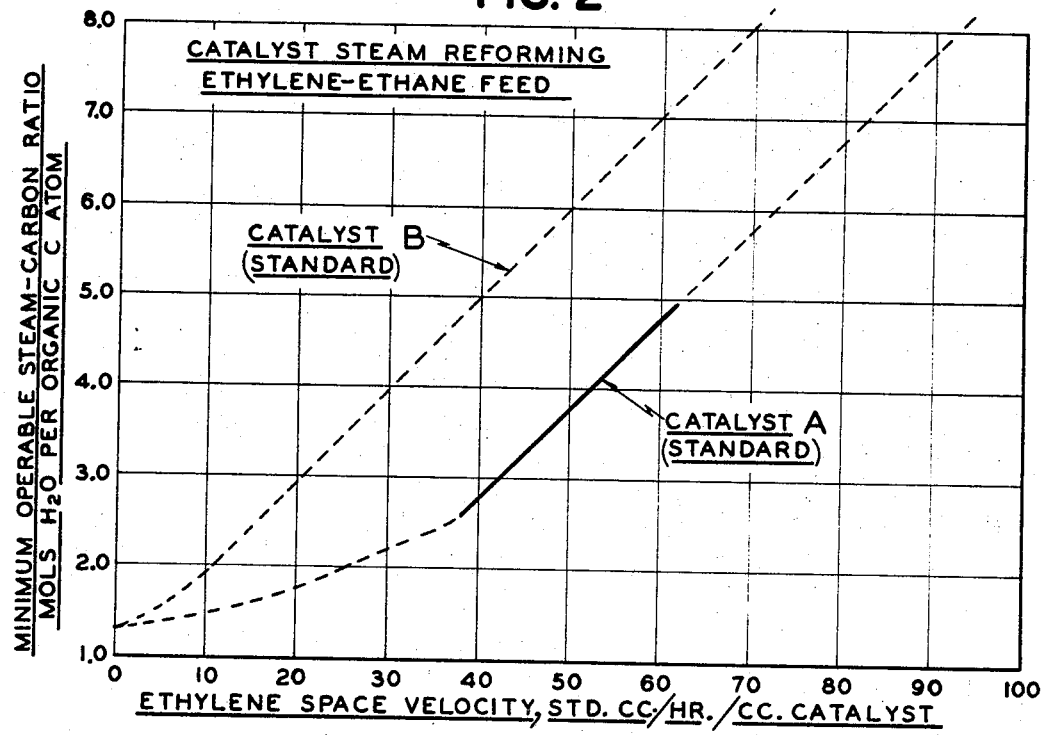

FIGURE 2 of the accompanying drawing shows experimental data obtained with an ethylene-ethane feed using a standard commercial catalyst as a basis of comparison.

The remainder of the catalyst charge is a porous refractory material capable of maintaining high mechanical strength and possessing steam and high temperature stability. Thus, for example, this component of the catalyst may be various non-reducible or difficulty reducible inorganic oxides such as alumino-silicates; calcium silicates; silica; zirconia; magnesia; alumina such as alpha-alumina or a form which converts to alpha-alumina under the process operating conditions; and various admixtures thereof as well as in combination with other inorganic oxides. Examples of refractory materials of the latter type are porous refractory brick and cements including chrome and hydraulic cements, which usually contain various inorganic oxides such as magnesia, calcium oxide, etc., as binding agents, combined with silica and/or alumina. From the standpoint of catalyst life, it is preferred to employ a refractory material which is substantially inert to attack by the added alkali upon prolonged use. If the refractory does contain components capable, for example, of neutralizing the added alkali, the added alkali component should be added in an amount sufficient to compensate for any loss due to neutralization and still have the net requisite amount of uncombined alkaline compound to achieve reduction of steam requirements. Thus, if it is not desired to utilize more alkali than is necessary to achieve the desired effects on reduction of of steam requirements, the preferred support, from the standpoint of catalyst life, is one which is not attacked by the added alkaline compound, such as zirconia or cement-type supports which are either neutral or alkaline in the presence of the added alkaline compound.

The catalysts may be prepared by a variety of methods without departing from the scope of this invention. One method comprises depositing nickel oxide on the refractory support or carrier material by soaking the support with a nickel precursor compound such as nickel nitrate, nickel carbonate or nickel sulfate, by forming a slurry of the support and nickel salt and agitating, or by spraying the nickel salt solution on the support. The catalyst may then be dried and/or calcined, followed by addition of the alkaline compound usually in the form of a solution, by an impregnation or soaking technique and then dried and/or calcined. Another method comprises depositing the alkaline compound on the refractory support, followed by addition of the nickel salt to the dried and/or calcined composite. Alternatively, the catalysts may be prepared by simultaneous addition of the nickel and alkaline compound to the support.

In addition to the above methods, the catalysts employed in accordance with the process of this invention may be prepared by impregnation or incorporation of the alkaline salt in the form of a solution, slurry or solid into a mixture comprising nickel compounded with the support. The catalysts also may be prepared by admixing the three principal components in the dry state in the desired proportions without departing from the scope of this invention.

When the precursor of the nickel and/or alkali compounds are added in the form of a solution, intermediate or final drying steps may be employed to remove the solvent such as water and are usually conducted at a temperature between about 200° and about 400° F. for between about 2 and about 30 hours. Those methods which employ a nickel salt include an intermediate or final calcination step to convert the nickel salt to nickel oxide or nickel or mixtures thereof. Calcination may be effected at a temperature between about 800° and about 1700° F., more usually at a temperature below 1200° F., in the presence of air, nitrogen, or reducing gas for between about 2 and about 36 hours. It has been found that heat treatment of the catalyst at temperatures above those ordinarily employed for calcination has a beneficial effect on the catalyst. Thus, instead of (or in addition to) the usual calcination treatment, the catalyst may be heat-treated at a temperature between about 1700° F. and about 2000° F. for between about 1 and about 36 hours, the catalysts so treated leading to further reduction of steam requirements.

The catalytic steam reforming process of this invention is applicable to a feedstock containing aliphatic and aromatic hydrocarbons from methane to higher molecular weight hydrocarbons including acyclic and alicyclic paraffinic and olefinic organic compounds such as those containing up to about 40 carbon atoms per molecule or molecular weights as high as about 560. The feedstock may be a single hydrocarbon such as ethylene, ethane, propane, propylene, hexene, hexane, normal heptane, heptene, etc., and mixtures thereof including various petroleum fractions such as light naphtha (e.g. boiling range of about 100°–250° F.), heavy naphtha (e.g., boiling range of about 200°–400° F.), gas oil (e.g., boiling range of about 400°–700° F.), as well as mineral oils, crude petroleum including topped and residual oils, and refinery and coke oven gases.

The steam requirement for the steam-hydrocarbon reforming process is defined by the steam/carbon ratio, which is the number of mols of steam charged to the reaction zone per atom of carbon charged. For example, a feed gas composition of 6 mols of steam per mol of propane corresponds to a steam/carbon ratio of 2.0 For any individual hydrocarbon from methane to gasoline boiling range hydrocarbons and higher molecular weight fractions, including olefinic hydrocarbons, there is a minimum steam to carbon ratio required for the carbon-free (operable) catalytic reforming of that individual hydrocarbon. Among olefinic and non-olefinic hydrocarbons as distinct groups, the minimum operable steam to carbon ratios for individual members of the group vary in accordance with molecular weight. That is, as the molecular weight of the hydrocarbon to be gasified increases, the steam requirements also increase. Further, for any mixtures of hydrocarbons, the critical minimum amount of steam which may be used with the mixture for its carbon-free catalytic reforming is also dependent upon molecular weight and increases as the molecular weight of the mixture increases. From the standpoint of operability of any given steam reforming process including the process of this invention, there is no upper limit to the steam to carbon ratios which can be used. However, as stated above, there is a critical minimum steam to carbon ratio which is essential to the successful or carbon-free operation of such a process. As a practical economic matter, it is always preferred to operate with the lowest possible steam to carbon ratio in view of the cost of steam, and from the standpoint of operation of the process and size of equipment. Since it is highly desirable to operate close to the minimum operable amount of steam, and since the catalysts of this invention allow for successful continuous operation of the process at a steam/carbon ratio which is itself below the critical minimum value required for standard and presently employed catalysts, it is readily apparent that the catalyst and process of this invention constitute valuable advancements in the field of steam reforming of hydrocarbons.

It has been found that when conventional high nickel compounded steam reforming catalysts are employed to convert methane to hydrogen-rich gas, the molar ratio of steam to hydrocarbon is close to the theoretical value of 1.0 and is about 1.1. In addition, steam reforming of methane presents relatively no problem from the standpoint of carbon deposition, and can be converted with conventional catalysts at close to theoretical steam values with substantially no carbon deposition, although standard catalysts generally require the use of a relatively high excess of steam as a safety factor. As the molecular weight increases above that of methane, the steam requirements become progressively more severe. For example, when using a standard nickel steam reforming catalyst, the minimum critical steam/carbon ratio for the conversion of hydrocarbons having a molecular weight from 16 (methane) to about 110 (e.g., naphtha) or higher, increases from 1.1 to about 4, the heavier hydrocarbons requiring still higher amounts of steam. For the conversion of propane (molecular weight=44) and of heptane (molecular weight=100), for example, to hydrogen-rich gas with conventional high nickel steam reforming catalysts, the minimum steam to carbon ratios are 1.5 and 3.0, respectively.

When using the catalysts of this invention, particularly for the gasification of hydrocarbons having a molecular weight above methane, the minimum operable molar ratio of steam to organic carbon, that is, the molar ratio required for the conversion of the particular feedstock to hydrogen-rich gas with substantially no carbon formation, is significantly and markedly less than the minimum operable molar ratio required for the conversion of the same feedstock in the presence of a conventional high nickel steam reforming catalyst to which no alkali metal compound has been incorporated or added. Thus, for example, when a high nickel reforming catalyst is employed to effect conversion of normal heptane to hydrogen-rich gas, the minimum operable steam/carbon ratio is about 3, whereas substantially the same conversion is continuously effected in the presence of the catalysts of this invention at significantly lower steam requirements. The same marked decrease in steam requirements is also realized when lower and higher molecular weight hydrocarbons or mixtures thereof are employed.

When saturated hydrocarbons or fractions thereof having a molecular weight from 16 (methane) to 110 (e.g., naphtha), for example, are steam reformed in the presence of the catalysts of this invention, they may be converted to admixtures of hydrogen and oxides of carbon or hydrogen-rich gas at minimum steam/carbon ratios of from 1 to about 2.0, the lower steam ratios within this range applying to the lower molecular weight hydrocarbons or mixtures thereof, the higher steam ratios applying to the higher molecular weight hydrocarbone or mixtures thereof.

When olefinic hydrocarbons or feedstocks containing olefins are steam reformed with conventional catalysts, the steam requirements are even more severe than those required for paraffinic and other saturated feedstocks of about the same molecular weight, since such feedstocks tend to deposit carbon rapidly, resulting not only in loss of carbon values but also making continuous operation impossible. On the other hand, the catalysts of this invention allow continuous steam reforming of such feedstocks at steam/carbon ratios which again are significantly lower than those required when using standard catalysts. To reduce the required steam/carbon ratio for a highly olefinic feedstock, such feedstock can be partially or wholly hydrogenated, if desired, prior to treatment by the process of this invention, such treatment being largely dependent upon economic considerations. However, due to the fact that the present catalysts permit the use of feedstocks relatively high in olefins, hydrogenation is not a necessity.

Similarly, when sulfur-containing feeds are employed, steam requirements are more severe than when sulfur-free feedstocks are utilized, sulfur tending to cause a rapid decline in the selectivity of standard catalysts and promote carbon lay down on the catalyst. Thus, presently employed high nickel steam reforming catalysts are necessarily used to effect conversions of hydrocarbon feedstocks which have been desulfurized to very low sulfur contents such as below 5 or 2 parts per million (p.p.m.). It has been found quite unexpectedly that the contact materials of this invention possess improved resistance to the usual adverse effects of sulfur-containing feeds, and may be used for the steam reforming of hydrocarbon feeds containing sulfur contents up to about 2000 p.p.m. Thus, for example, the process of the present invention may be used to reform naphtha fractions containing from about 50 to about 500 p.p.m. sulfur. The addition of hydrogen will usually be found beneficial where the feed contains sulfur compounds.

The process of the present invention may be effected over a relatively wide range of operating conditions including temperatures between about 600 and about 1800° F. When high B.t.u. hydrogen-containing gas is desired, the lower temperatures within this range are employed, such as between about 600° F. and about 1000° F. Usually the feed is preheated before introduction to the catalyst bed. Thus, for example, suitable operating conditions also include initial hydrocarbon feedstock temperatures or pre-heat temperatures of about 600° F. to about 1200° F. atmospheric or superatmospheric reforming pressures, space velocities in the reforming zone of about 50 to about 1000 volumes of hydrocarbons, expressed as $C_1$ equivalents per hour per volume of reforming catalyst, the temperatures maintained in the reforming zone usually being between about 1000–1200° F. and about 1800° F.

Pre-heating of the hydrocarbon feedstock to between about 600° F. and about 1200° F. renders attainment and maintenance of suitable temperatures in the reforming zone easier. This is of some importance because if the feedstock necessarily contacts the catalyst at excessively low temperatures, an otherwise adequate steam to carbon ratio will not prevent carbon formation at or near the entrance to the catalyst bed. Since catalytic steam reforming is endothermic and there are practical limits to the amount of heat which can be added to maintain the suitable elevated temperatures in the reforming zone, it is preferred to pre-heat the feedstock to as high a temperature as is consistent with avoiding pyrolysis or other heat deterioration of the feedstock.

The pressure employed may vary over relatively wide limits and include atmospheric and superatmospheric pressure. With standard reforming catalysts, pressure has no significant effect upon minimum operable steam to carbon ratios for non-olefinic hydrocarbons, but has an appreciable effect upon such ratios for olefinic hydrocarbons. Thus, when steam reforming olefinic feedstocks using conventional nickel catalysts, rising reforming pressure results in increasing required minimum operable steam-to-carbon ratios. On the other hand, in using the catalysts of this invention pressure has no significant effect on minimum steam-to-carbon ratios. Therefore, when steam reforming with the alkalized catalysts of this invention, the choice of a particular operating pressure is principally influenced by the pressure required for the hydrogen production of the present process. For many significant uses of the hydrogen production, elevated pressures are required and it is advantageous to conduct the reforming process at substantially superatmospheric pressure so as to reduce subsequent compression. Generally, it is preferred to operate the catalytic reforming zone at a pressure between about 0 and about 1000 pounds per square inch gage (p.s.i.g.), more usually at a pressure up to about 500 p.s.i.g.

Generally, space velocities in the catalytic reforming zone between about 100 and about 1000 volumes of $C_1$ hydrocarbon equivalents per hour per volume of reforming catalyst are employed, and in commercial practice more usually a space velocity between 350 and about 750 is used.

In carrying out the process of this invention, the contact material may be used in the form of lumps of irregular shape, extrusions, rings, compressed pellets or powder, including layers of these various physical forms. The operation may be as a fixed bed or fluidized catalyst system. The steam required for the reforming may be premixed with the hydrocarbon feed or it may be admitted to the reaction zone through a separate line. The feed may also contain inert materials such as nitrogen. In another embodiment of the process of this invention, oxygen may be admitted to the reaction zone such as, for example, in an amount from about 0.2 to about 0.8 mol or more per mol of organic carbon in the feed, in the form of an oxygen-rich gas or substantially pure oxygen, or air may be used. For example, air may be used when the product gas is to be utilized in the synthesis of ammonia.

The following examples are offered as a better understanding of the present invention and are not to be construed as unnecessarily limiting thereto.

EXAMPLES

The specific steam reforming runs designated as run numbers 1–4 below were conducted in a commercial bench scale reactor (1 inch in diameter x 7 feet in length) positioned within a resitsance furnace having a reaction well about 2 inches in diameter, the walls of which are adapted to be resistance heated. The reactor was divided into an upper inlet pre-heat zone and a lower outlet reaction zone.

Hydrocarbon liquid and water were separately metered through calibrated restriction tubes at a rate in accordance with a predetermined steam to carbon ratio and space velocity. The liquids were mixed, vaporized and introduced to the upper inlet pre-heating zone of the furnace. Heating of the vaporous mixture in the pre-heating zone was controlled to give the predetermined pre-heat as sensed by thermocouples placed in the reactor and its walls. The pre-heated vaporous mixture then passed in contact with the catalyst in the lower outlet zone of the reactor, the mixture being heated during its contact with the catalyst to maintain it at suitable reforming temperatures, also as sensed by thermocouples placed in the reactor and its walls.

Product gases were cooled so as to condense unreacted water and separate the non-condensible gases. The condensed water was collected and weighed and the non-condensible gases were metered through a wet-test gas meter before being vented to atmosphere. Prior to metering, the non-condensed gases passed through a back-pressure regulator by means of which a predetermined pressure was maintained in the furnace. Samples were taken of the non-condensible gases and analyzed. Pressure drop across the catalyst bed was measured to give an indication of carbon formation as shown by a measurable change in the reactor pressure drop.

With this equipment and procedure, a series of runs were made on ASTM grade n-heptane having less than 1 p.p.m. sulfur, starting at a high steam to carbon ratio and gradually reducing the ratio in successive runs until carbon formation resulted. The particular operating conditions and results are given in Table I.

Catalyst I

In run numbers 1 and 2 of the following Table I, the reaction zone was charged with a 425 gram aliquot (430 milliliters) of a commercial high nickel steam reforming catalyst which had been pre-activated with an atmosphere consisting of 339 standard cubic feet per hour of water vapor and 100 standard cubic feet per hour of hydrogen at 1800° F. and 1850° F. outlet temperature and atmospheric pressure. This pre-activated commercial catalyst is designated as Catalyst I and contains on a weight basis: 30.3 percent nickel oxide and a refractory material containing as the principal constituents: 11.0 percent $Al_2O_3$, 25.5 percent $SiO_2$, 3.6 percent $MgO$, 1.4 percent $Fe_2O_3$ and 19.0 percent $CaO$.

In run numbers 3 and 4 of the following Table I, the reaction zone was charged with 425 grams (375 milliliters) of the catalyst of this invention designated as Catalyst II, which was prepared as follows:

Catalyst II

A 500 gram aliquot of the same above-described pre-activated commercial steam reforming catalyst designated as Catalyst I and having the above composition, was calcined for 2 hours at 1000° F. and impregnated with an aqueous solution of sodium carbonate prepared by dissolving 44 grams of sodium carbonate in 120 cc. of boiling water. The catalyst was then dried at 400° F. This procedure was repeated with another 500 gram aliquot of the same commercial pre-activated catalyst, impregnating the caatlyst with the same amount of sodium carbonate. The two batches of dried sodium carbonate impregnated catalyst were combined and calcined for 2 hours at 1000° F. The catalyst thus prepared contains the above-designated constituents in the same proportions and, in addition, 7.3 weight percent sodium carbonate ($Na_2CO_3$), or 3.2 weight percent, calculated as sodium metal.

TABLE I.—STEAM REFORMING OF NORMAL HEPTANE

|  | Run No. | | | |
| --- | --- | --- | --- | --- |
|  | 1 | 2 | 3 | 4 |
| Catalyst | I | I | II | II |
| Duration, Hours | 2 | 12 | 16 | 2 |
| Reactor, Inlet Temp., °F | 795 | 805 | 790 | 795 |
| Reactor, Outlet Temp., °F | 1,400 | 1,400 | 1,450 | 1,440 |
| Reactor, Outlet Pressure, p.s.i. | 20 | 20 | 20 | 20 |
| $C_1$ Space Velocity, s.c.f.h. $C_1$/CF Catalyst | 318 | 323 | 590 | 560 |
| $H_2O/C_1$ Ratio, Output Basis [1] | 3.03 | 2.53 | 1.33 | 1.1 |
| Rate of Reactor Pressure Drop ($\Delta P$) Increase, Inches $H_2O$/Hr | 0 ([2]) | 0.38 ([3]) | 0 ([2]) | 2.6 ([3]) |
| Product Gas Analysis, Mol percent: | | | | |
| $H_2$ | 73.3 | 71.6 | 66.7 | 66.6 |
| CO | 15.9 | 18.9 | 28.0 | 28.5 |
| $CO_2$ | 10.7 | 9.4 | 3.6 | 2.5 |
| $CH_4$ | 0.1 | 0.1 | 1.7 | 2.4 |

[1] Output O/C Ratio.
[2] Operable.
[3] Inoperable.

The term "operable" as used in Table I and throughout the application is intended to mean that operation at which substantially no free carbon is deposited on the catalyst, while the term "inoperable" is intended to mean a steam reforming operation during which free carbon is deposited on the catalyst as observed by a rise in pressure drop. Inspection of the above data of Table I shows that, when the standard commercial steam reforming catalyst (Catalyst I) was employed, a steam/carbon ratio of about 3 was required to prevent pressure buildup or to obtain the carbon free steam reforming of normal heptane to hydrogen-rich gas. On the other hand, when using the catalyst of this invention, carbon free steam reforming of normal heptane to hydrogen-rich gas was effected at a steam/carbon ratio as low as 1.3. In other words, on a comparative basis, carbon free catalytic steam reforming in the presence of a standard steam reforming catalyst required more than 100 percent more steam than that required with the catalysts of this invention.

The operability of steam reforming of a sulfur-containing feed in the presence of the catalysts of this invention is illustrated by the experimental data tabulated in the following Table II. This operation was carried out in the above-described equipment using normal heptane containing about 200 parts per million of sulfur, added as ethyl mercaptan as the feed and the above-described Catalyst II. The specific operating conditions employed and results are tabulated below.

TABLE II

Steam reforming of n-heptane containing about 200 p.p.m. sulfur

| | |
| --- | --- |
| Run number | 5 |
| Length of period, hrs. | 12 |
| Catalyst | II |
| $H_2O/C_1$, mol ratio (output basis) [1] | 1.9 |
| Reactor inlet, °F | 780 |
| Reactor outlet, °F | 1430 |
| Reactor outlet pressure, p.s.i.g | 20.0 |
| $C_1$ space velocity, s.c.f.h. $C_1$/CF catalyst | 510 |
| Catalyst bed $\Delta P$, inches of $H_2O$: | |
|   Start | 18.5 |
|   Finish | 18.5 |
|   Rate of increase, inches/hr. | 0.0 |
| Product gas analysis, mol percent [2]: | |
|   $H_2$ | 69.0 |
|   CO | 21.6 |
|   $CO_2$ | 7.5 |
|   $CH_4$ | 1.9 |
|   $C_2H_6$ | |
|   $C_3H_8$ | |

[1] Output O/C ratio.
[2] Average of two gas samples, start and end of period.

The results tabulated in Table II, by which it is shown that the reaction occurred without carbon lay down, are unexpected since steam reforming of sulfur-containing feeds usually leads to rapid carbon deposition. Sulfur analysis of the dumped catalyst from run number 5 of Table II showed the catalyst to contain only 0.05 weight percent sulfur. Comparison of the data of Table II with the results obtained in run number 1 of Table I above dmonstrates that the catalysts of this invention are capable of effecting steam reforming of a sulfur-containing feed at a steam/carbon ratio (1.9) which is still significantly lower than the minimum steam requirement (3) for the carbon-free catalytic reforming of sulfur-free feed in the presence of standard catalyst.

The following runs 6 through 25 were conducted in a reactor consisting of a one inch diameter quartz tube fitted with an internal thermowell. In operation, 100 cc. (12/20 mesh) catalyst was used to make up a catalyst bed eight inches in length. The catalyst bed was located below seven inches of alundum chips used as the pre-heat zone. Before the start of the runs, the 100 cc. charge of catalyst was hydrogen pre-treated for one hour at 1400° F. Water was metered through a calibrated flow meter, vaporized and mixed with pre-heat hydrogen gas at the reactor inlet. During operation, the catalyst temperature was measured at the top, middle and bottom of the catalyst bed. Effluent gases were passed through a condenser and receiver to collect unreacted water. After measuring in a wet test meter, the product gas was then vented and effluent gases were sampled and analyzed by gas chromatography or mass spectrogram techniques. Pressure drop across the catalyst bed was measured to give an indication of carbon formation as shown by a measurable change in the reactor pressure drop.

With this equipment and procedure, a series of runs was made at atmospheric pressure (15 p.s.i.a.) with a typical steam reforming catalyst used as a standard, and the alkalized catalysts of this invention, using feedstocks containing ethylene. The catalysts employed in these runs were the following catalysts designated as Catalysts A and III–XII, inclusive. The operating conditions and results obtained using standard steam reforming Catalyst A are set forth in Table III, and the results obtained with Catalysts III–XII, inclusive, are tabulated in Table IV.

Catalyst A

This catalyst is a commercial nickel-steam reforming catalyst (Girdler Company catalyst G–56) containing on a weight basis: 16.0 percent nickel oxide and a refractory material containing as the principal constituents: 69.2 percent $Al_2O_3$, 3.0 percent $SiO_2$, 1.2 percent MgO, 0.55 percent $Fe_2O_3$ and 4.1 percent CaO; X-ray analysis of the alumina showed it to be the alpha crystalline form.

Catalyst III

A 150 gram aliquot (12/20 mesh) of the above-described commercial steam reforming catalyst, designated as Catalyst A, was impregnated with an aqueous solution of magnesium nitrate in an amount sufficient to yield about 3.5 percent magnesium salt, calculated as the metal, in the finished catalyst. The solution was prepared by dissolving 56.9 grams of magnesium nitrate hexahydrate in 55 cc. of water. After thoroughly mixing, the mixture was dried in an oven at 240° F., followed by calcination for 2 hours at 1000° F.

Catalyst IV

A 150 gram aliquot (12/20 mesh) of commercial steam reforming catalyst, designated as Catalyst A, was calcined for 2 hours at 1000° F., and impregnated with an aqueous solution of calcium nitrate in an amount sufficient to yield about 3.5 weight percent calcium salt, calculated as the metal, in the finished catalyst. The solution was prepared by dissolving 31.8 grams of calcium nitrate tetrahydrate in 55 cc. of water. After mixing thoroughly, the mixture was dried in an oven at 240° F., followed by calcination for 2 hours at 1000° F.

Catalyst V

A 150 gram aliquot (12/20 mesh) of the same commercial steam reforming catalyst, designated as Catalyst A, was calcined for 2 hours at 1000° F., and impregnated with an aqueous solution of lithium nitrate in an amount sufficient to yield about 3.5 weight percent lithium salt, calculated as the metal, in the finished catalyst. The solution was prepared by adding 88.7 cc. of concentrated nitric acid previously chilled in an ice bath to 58.2 grams of lithium hydroxide monohydrate. The resultant lithium nitrate trihydrate solution (120 cc.) thus obtained was then added to Catalyst A in increments large enough to thoroughly wet the catalyst particles, drying each time at 240° F. to ensure uniformity. After the last increment of solution was added, the catalyst was dried at 240° F. and calcined for 2 hours at 1000° F.

Catalyst VI

A 200 gram aliquot (12/20 mesh) of commercial steam reforming catalyst, designated as Catalyst A, was calcined and then impregnated with an aqueous solution of potassium carbonate in an amount sufficient to yield about 3.5 weight percent potassium salt, calculated as the metal, in the finished catalyst. The solution was prepared by dissolving 13.2 grams of potassium carbonate in 116 cc. of water. After mixing thoroughly, the mixture was dried at 240° F. and calcined for 2 hours at 1000° F.

Catalyst VII

A 400 gram aliquot (12/20 mesh) of the commercial steam reforming catalyst, designated as Catalyst A above, was impregnated with an aqueous solution of potassium carbonate in an amount sufficient to yield about 3.5 weight percent potassium salt, calculated as the metal, in the finished catalyst. The solution was prepared by dissolving 25.7 grams of potassium carbonate in 176 cc. of water. After mixing thoroughly, the mixture was dried overnight at 250° F., followed by calcination for 2 hours at 1000° F.

Catalyst VIII

A 150 gram aliquot (12/20 mesh) of the commercial steam reforming catalyst, designated as Catalyst A, was calcined for 2 hours at 1000° F., followed by impregnation with an aqueous solution of sodium nitrate in an amount to yield about 3.5 weight percent sodium salt, calculated as the metal, in the finished catalyst. The solution was prepared by dissolving 19.9 grams of sodium nitrate in 56 cc. of water. After mixing thoroughly, the mixture was dried in an oven at 240° F., followed by calcination for 2 hours at 1000° F.

Catalyst IX

A 300 gram aliquot (12/20 mesh) of the commercial steam reforming catalyst, designated as Catalyst A, was calcined for 2 hours at 1000° F., followed by impregnation with an aqueous solution of sodium carbonate in an amount sufficient to yield about 3.5 weight percent sodium salt, calculated as the metal, in the finished catalyst. The solution was prepared by dissolving 25 grams of sodium carbonate in 150 cc. of water. After mixing thoroughly, the mixture was dried in an oven at 240° F., followed by calcination for 2 hours at 1000° F.

Catalyst X

A 150 gram aliquot (12/20 mesh) of the commercial steam reforming catalyst, designated as Catalyst A, was calcined for 2 hours at 1000° F., followed by impregnation with an aqueous solution of sodium carbonate in an amount sufficient to yield about 3.5 weight percent sodium salt, calculated as the metal, in the finished catalyst. The solution was prepared by dissolving 12.5 grams of sodium carbonate in 55 cc. of water. After mixing thoroughly, the mixture was dried in an oven at 240° F., followed by calcination for 2 hours at 1000° F.

Catalyst XI

A 200 gram aliquot (12/20 mesh) of the commercial steam reforming catalyst, designated as Catalyst A above, was calcined for 2 hours at 1000° F., followed by the addition thereto of an aqueous solution of sodium silicate in an amount sufficient to yield about 3.5 weight percent of sodium salt, calculated as the metal, in the finished catalyst. The solution was prepared by dissolving 44.5 grams of sodium silicate ($Na_2SiO_3 \cdot 9H_2O$) in 74.7 cc. of water. After mixing thoroughly, the mixture was dried overnight at 240° F., followed by calcination for 2 hours at 1000° F.

Catalyst XII

A 400 gram aliquot (12/20 mesh) of commercial steam reforming catalyst, designated as Catalyst A above, was impregnated with an aqueous solution of sodium carbonate in an amount sufficient to yield about 3.5 weight percent sodium salt, calculated as the metal, in the finished catalyst. The solution was prepared by dissolving 33.41 grams of sodium carbonate in 204 cc. water. After mixing thoroughly, the mixture was dried overnight at 240° F. A 240 gram aliquot of the dried composite was placed in a quartz dish and heated in a furnace at 2000° F. for 24 hours.

TABLE III.—STEAM REFORMING WITH STANDARD CATALYST A

| | Run Number | | | | | | | |
|---|---|---|---|---|---|---|---|---|
| | 6 | 7 | 8 | 9 | 10 | 11 | 12 | 13 |
| | Catalyst Number | | | | | | | |
| | A | A | A | A | A | A | A | A |
| Feedstock | 70 mol percent ethylene/30 mol percent ethane | | 25 mol percent ethylene/75 mol percent ethane | | | | | |
| Added Alkali | 0 | 0 | 0 | 0 | 0 | 0 | 0 | 0 |
| Operating Conditions: | | | | | | | | |
| Catalyst Weight, grams | 61.5 | 65.1 | 72.7 | 67.7 | 69.1 | 69.8 | 63.5 | 63.5 |
| Reactor Temperature, ° F., top | 1,259 | 1,330 | 1,212 | 1,157 | 1,116 | 1,079 | 1,080 | |
| Reactor Temperature, ° F., middle | 1,432 | 1,435 | 1,431 | 1,440 | 1,474 | 1,485 | 1,437 | 1,429 |
| Reactor Temperature, ° F., bottom | 1,433 | 1,425 | 1,429 | 1,425 | 1,424 | 1,427 | 1,406 | 1,409 |
| Flow Rate, cc.: | | | | | | | | |
| Hydrocarbon/minute | 69 | 78–95 | 153 | 170 | 137 | 169 | 164 | 153 |
| $H_2O$/minute | 0.38 | 0.62 | 0.76 | 0.85 | 0.53 | 0.86 | 1.03 | 0.74 |
| Space Velocity, cc. $C_1$/hr./cc. catalyst | 83 | 94–114 | 184 | 204 | 164 | 203 | 196 | 183 |
| $H_2O/C_1$ ratio | 3.6 | 5.3 | 3.3 | 3.3 | 2.6 | 3.4 | 4.0 | 3.2 |
| Run time/minutes | 121 | 7 | 120 | 60 | 120 | 75 | 120 | 105 |
| Rate of Reactor Pressure Drop ($\Delta P$) Increases, Inches $H_2O$/hr | 29.4 | 100–150 | 5.1 | 12 | 11.0 | 11 | 0.8 | 3.5 |
| Product Gas Analysis, Mol Percent: | | | | | | | | |
| $H_2$ | 74.7 | 75.8 | 73.6 | 74.3 | 73.4 | 74.6 | 74.1 | 73.2 |
| CO | 14.8 | 11.2 | 14.9 | 14.3 | 17.4 | 14.4 | 12.7 | 15.8 |
| $CO_2$ | 10.5 | 13.0 | 11.4 | 11.3 | 9.1 | 10.9 | 13.1 | 10.8 |
| $CH_4$ | | | 0.1 | 0.1 | 0.1 | 0.1 | 0.1 | 0.2 |
| $C_2H_4$ | | | | | | | | |
| $C_2H_6$ | | | | | | | | |
| Minimum Steam/$C_1$ ratio | 4.5 | 8.5–10.7 | 3.5 | 3.7 | 2.9 | 3.7 | 4+ | 3.3 |
| Space Velocity of Ethylene, cc. $C_1$/hr./cc. cat | | | | | | | | |

TABLE IV.—STEAM REFORMING WITH ALKALIZED CATALYSTS

| | Run Number | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 |
| | Catalyst Number | | | | | | | | | | | |
| | III | III | IV | V | VI | VII | X | X | VIII | IX | XI | XII |
| | Feedstock | | | | | | | | | | | |
| | 25 mol percent ethylene/75 mol percent ethane | | 70 mol percent ethylene/30 mol percent ethane | | 25 mol percent ethylene/30 mol percent ethane | | 70 mol percent ethylene/30 mol percent ethane | | | 70 mol percent ethylene/30 mol percent ethane | 25 mol percent ethylene/75 mol percent ethane | 70 mol percent ethylene/30 mol percent ethane |
| Added Alkali | Mg | Mg | Ca | Li | K | K | Na | Na | Na | Na | Na | Na |
| Operating Conditions: | | | | | | | | | | | | |
| Catalyst Weight, grams | 71.0 | 71.0 | 72.0 | 73.1 | 73.1 | 73.5 | 71.6 | 71.6 | 74.4 | 67.5 | 71.7 | 67.3 |
| Reactor Temperature, °F., top | 1,167 | 1,169 | 1,164 | 1,168 | 1,160 | 1,100 | 1,215 | 1,197 | 1,085 | 1,102 | 1,082 | 1,152 |
| Reactor Temperature, °F., middle | 1,448 | 1,439 | 1,453 | 1,445 | 1,432 | | 1,342 | 1,332 | 1,457 | 1,416 | 1,374 | 1,406 |
| Reactor Temperature, °F., bottom | 1,404 | 1,403 | 1,410 | 1,399 | 1,437 | 1,429 | 1,405 | 1,424 | 1,430 | 1,425 | 1,401 | 1,422 |
| Flow Rate, cc.: | | | | | | | | | | | | |
| Hydrocarbon/minute | 191 | 153 | 176 | 150 | 111 | 128 | 173 | 204 | 213 | 155 | 148 | 134 |
| $H_2O$/minute | 0.71 | 0.51 | 0.56 | 0.38 | 0.45 | 0.72 | 0.55 | 0.50 | 0.45 | 0.90 | 0.43 | 0.31 |
| Space Velocity, cc. $C_1$/hr.cc. catalyst | 229 | 193 | 211 | 180 | 133 | 154 | 208 | 245 | 256 | 194 | 177 | 161 |
| $H_2O/C_1$ ratio | 3.3 | 2.3 | 2.1 | 1.7 | 2.7 | 3.7 | 2.1 | 1.5 | 1.4 | 3.9 | 1.9 | 1.5 |
| Run time/minutes | 75 | 120 | 60 | 105 | 75 | 32 | 105 | 90 | 120 | 90 | 120 | 120 |
| Rate of Reactor Pressure Drop (ΔP) Increase, Inches $H_2O$/hr | 1.0 | 2.5 | 12 | 0 | 20.8 | 34.5 | 0 | 0 | 0 | 12.8 | 1.0 | 6.4 |
| Product Gas Analysis, Mol Percent: | | | | | | | | | | | | |
| $H_2$ | | 75.6 | 67.3 | 72.9 | 74.8 | 75.2 | 72.2 | | 68.5 | 74.7 | 75.5 | 70.0 |
| CO | | 17.6 | 17.4 | 21.6 | 14.4 | 13.3 | 19.9 | | 26.1 | 11.7 | 18.9 | 23.7 |
| $CO_2$ | | 6.6 | 15.2 | 4.9 | 10.8 | 11.5 | 7.7 | | 4.2 | 13.6 | 5.2 | 5.2 |
| $CH_4$ | | 0.2 | 0.1 | 0.6 | | | 0.2 | | 1.2 | | 0.4 | 1.1 |
| $C_2H_4$ | | | | | | | | | | | | |
| $C_2H_6$ | | | | | | | | | | | | |
| Minimum Steam/$C_1$ ratio | 3.4 | 3.4 | 2.5 | <1.7 | 3.4 | 4.7 | 1.5 | 1.5 | <1.4 | 4.3 | 1.9+ | 1.7 |
| Space Velocity of Ethylene, cc. $C_1$/hr./cc. cat | 57 | 57 | 53 | 45 | 93 | 108 | 61 | 61 | 64 | 136 | 44 | 113 |
| Minimum $H_2O/C_1$ ratio for Catalyst A at about Same Space Velocity of Ethylene | 4.5 | 4.5 | 3.7 | 3.5 | ¹(8) | ¹(9.7) | ¹(4.9) | ¹(4.9) | ¹(5.4) | ¹(12.4) | 3.5 | ¹(10.1) |

¹ Estimated value for Catalyst A using Figure 1, line labled "Catalyst A".

The accompanying FIGURE 2 is a graph showing the correlation between space velocity of ethylene in ethylene/ethane feeds and minimum steam/carbon ratios for the indicated conventional steam reforming catalysts designated as Catalyst A and Catalyst B (described below). The line labeled "Catalyst A" of FIGURE 2 is based on a plot of the experimental data of runs 6 and 8–13 of Table III extrapolated to an ethylene space velocity of zero, the minimum steam/carbon ratio for ethane alone being about 1.3. Run number 7 of Table III shows that at a relatively high space velocity of ethylene of 66–80, and an operating steam/carbon ratio of 5.3, the carbon lay down on the catalyst was so rapid during the first 7 minutes of operation that the run had to be discontinued, showing that the operable minimum is not below 5.3. This result demonstrates that: (1) with standard catalysts, carbon-free steam reforming of feed at high ethylene space velocities is very difficult due to rapid plugging of the catalyst with carbon; and (2) the straight line extrapolation shown in FIGURE 2 is a reasonable method for estimating minimum steam/carbon ratios for conventional steam reforming catalysts at high ethylene space velocities since run number 7 shows the minimum ratio is not below the extrapolation line based on Catalyst A.

Inspection of the results obtained with alkalized Catalysts III–XII, tabulated in Table IV above, shows that in each instance the minimum steam/carbon ratio of the catalysts containing an added alkaline compound was lower than that for conventional steam reforming Catalyst A at about the same ethylene space velocity. For example, in runs 20 and 21 of Table IV, in which Catalyst X was employed, no carbon deposition on the catalyst was observable (indicated by a 0 pressure drop) at a steam/carbon ratio of 2.1 and 1.5, respectively. A slight decrease in the steam ratio following run 21 caused a reactor pressure drop, indicating that the minimum steam/carbon ratio was slightly below 1.5, the space velocity of ethylene in this run being 61. Inspection of FIGURE 2 shows that with conventional Catalyst A the minimum steam/carbon ratio at the same ethylene space velocity (61) is about 4.9. Since the theoretical minimum steam/$C_1$ ratio is 1.0, the maximum reduction possible in the steam/$C_1$ ratio at a space velocity of 61 is 3.9. Since the reduction of the minimum steam/$C_1$ ratio actually obtained was about 3.4 (4.9 minus 1.5), it is shown that with Catalyst X, the percent reduction in minimum steam requirements was about 87 percent.

Similar inspection of the data of Table IV shows that in the case of Catalysts V–XII to which an added alkali metal compound was added, the reduction of the minimum steam requirements was significantly greater than the reduction achieved with Catalyst III (runs 14 and 15) and Catalyst IV (run 16) to which magnesium and calcium compounds were added, respectively.

Another series of runs using a feed containing 70 mol percent ethylene and 30 mol percent ethane was made at atmospheric pressure (15 p.s.i.a.), using a commercial steam reforming catalyst, designated as Catalyst B, and Catalysts XIII–XVIII in which alkali concentration was varied. Substantially the same procedure employed in the above-described ethylene-ethane runs was employed. The operating conditions and results obtained with these catalysts are set forth in Table V.

Catalyst B

This catalyst is a commercial steam reforming nickel catalyst (Girdler Company catalyst G–29) containing on a weight basis: 32.0 percent NiO; 13.9 percent $Al_2O_3$ and $Fe_2O_3$ on a combined basis; 25.5 percent $SiO_2$; 9.9 percent MgO; and 18.7 percent CaO. The catalyst was ground to 12/20 mesh and calcined for 2 hours at 1000° F., and aliquots thereof were used in the preparation of the following Catalysts XIII–XVIII.

Catalyst XIII

A 200 gram aliquot of the above commercial catalyst, designated as Catalyst B, was impregnated with an aqueous solution of sodium carbonate in an amount sufficient to yield 0.5 weight percent sodium salt, calculated as the metal, in the finished catalyst. The solution was prepared by dissolving 2.3 grams of sodium carbonate in 50 cc. of water. After thorough mixing, the mixture was dried overnight at 240° F., followed by calcination for 2 hours at 1000° F.

Catalyst XIV

A 200 gram aliquot of the above commercial catalyst, designated as Catalyst B, was impregnated with an aqueous solution of sodium carbonate in an amount sufficient to yield about 1.5 weight percent sodium salt, calculated as the metal, in the finished catalyst. The solution was prepared by dissolving 7.14 grams of sodium carbonate in 50 cc. of water. After thorough mixing, the mixture was dried overnight at 240° F., followed by calcination for 2 hours at 1000° F.

Catalyst XV

A 200 gram aliquot of commercial catalyst, designated as Catalyst B, was impregnated with an aqueous solution of sodium carbonate in an amount sufficient to yield 2.5 weight percent sodium in the finished catalyst. The solution was prepared by dissolving 11.8 grams of sodium carbonate in 50 cc. of water. After thorough mixing, the mixture was dried overnight at 240° F., followed by calcination for 2 hours at 1000° F.

of the above-described commercial Catalyst B in two increments, mixing thoroughly each time and drying at 240° F. between the additions of the solution. The final mixture was dried overnight at 240° F., followed by calcination for 2 hours at 1000° F. Analysis of this catalyst showed it to contain 5.3 weight percent sodium, calculated as the metal.

Catalyst XVIII

A solution of sodium hydroxide was prepared by adding 2000 grams of sodium hydroxide pellets to 3400 cc. of de-ionized water and heating in an oven at 180–190° F. There were then added to this solution 3000 grams of the above-described commercial Catalyst B, maintaining the mixture at 180–190° F. for 2 hours with occasional stirring. Excess sodium hydroxide solution was then decanted and the catalyst dried overnight at 240° F., followed by calcination for 2 hours at 1000° F. Analysis of this catalyst showed it to contain 5.6 weight percent sodium, calculated as the metal.

TABLE V.—STEAM REFORMING OF ETHYLENE-ETHANE FEED

| | Run Number | | | | | | | | | | | | |
|---|---|---|---|---|---|---|---|---|---|---|---|---|---|
| | 26 | 27 | 28 | 29 | 30 | 31 | 32 | 33 | 34 | 35 | 36 | 37 | 38 |
| | Catalyst Number | | | | | | | | | | | | |
| | B | B | XIII | XIII | XIV | XIV | XV | XV | XVI | XVI | XVIII | XVIII | XVIII |
| Feedstock | 70 mol percent ethylene/30 mol percent ethane | | | | | | | | | | | | |
| Concentration of Added Alkali, weight percent | 0 | 0 | 0 | 0.5 | 1.5 | 1.5 | 2.5 | 2.5 | 3.5 | 3.5 | 5.3 | 5.6 | 5.6 |
| Operating Conditions: | | | | | | | | | | | | | |
| Catalyst Weight, grams | 102.1 | 102.1 | 104.0 | 104.0 | 102.2 | 102.2 | 104.2 | 104.2 | 104.2 | 107.3 | 107.3 | 99.7 | 99.7 |
| Reactor Temperature, ° F., top | | 1,191 | 1,187 | 1,180 | 1,165 | 1,159 | 1,170 | 1,150 | | 1,273 | 1,270 | 1,348 | 1,353 |
| Reactor Temperature, ° F., middle | | | | | 1,372 | 1,368 | 1,380 | 1,377 | 1,380 | 1,337 | 1,334 | 1,380 | |
| Reactor Temperature, ° F., bottom | 1,430 | 1,431 | 1,431 | 1,426 | 1,425 | 1,428 | 1,429 | 1,419 | 1,415 | 1,424 | 1,427 | 1,420 | 1,423 |
| Flow Rate, cc.: | | | | | | | | | | | | | |
| Hydrocarbon/minute | 44 | 69 | 75 | 97 | 77 | 96 | 120 | 0.66 | 0.71 | 132 | 123 | 136 | 127 |
| $H_2O$/minute | 0.72 | 0.59 | 0.72 | 0.73 | 0.71 | 0.69 | 0.66 | 0.71 | 0.54 | 0.50 | 0.35 | 0.60 | 0.43 |
| Space Velocity of Feed, cc. $C_1$/hr./cc. catalyst | 53 | 83 | 91 | 116 | 93 | 118 | 144 | 156 | 176 | 159 | 147 | 163 | 152 |
| Space Velocity of Ethylene in Feed | 37 | 60 | 63 | 81 | 65 | 82 | 100 | 109 | 123 | 111 | 103 | 114 | 107 |
| $H_2O/C_1$ ratio | 11.0 | 5.7 | 6.3 | 5.0 | 6.1 | 4.8 | 3.7 | 3.7 | 2.5 | 2.5 | 1.9 | 3.0 | 2.3 |
| Run time/minutes | 135 | 47 | 70 | 120 | 90 | 165 | 120 | 130 | 125 | 120 | 73 | 120 | 120 |
| Rate of Reactor Pressure Drop (ΔP) Increase, Inches $H_2O$/hr | [1] 0 | [2] 40.2 | [1] 0 | [2] 1.3 | [1] 0 | [2] 1.9 | [1] 0 | [2] 2.4 | [1] 0 | [1] 0 | [2] 5.2 | [1] 0 | [2] 2.0 |
| Product Gas Analysis, Mol percent: | | | | | | | | | | | | | |
| $H_2$ | 74.7 | 74.7 | 75.4 | 74.1 | 74.7 | 74.0 | 73.2 | 73.1 | 71.0 | 70.8 | 71.1 | 71.1 | 71.1 |
| CO | 5.0 | 7.4 | 7.9 | 9.5 | 7.6 | 10.1 | 11.8 | 12.2 | 14.9 | 14.7 | 19.5 | 13.8 | 18.2 |
| $CO_2$ | 20.3 | 17.9 | 16.7 | 16.4 | 17.7 | 15.8 | 14.4 | 13.7 | 12.5 | 12.7 | 8.0 | 13.4 | 9.1 |
| $CH_4$ | | | | | | 0.1 | 0.1 | 0.1 | 0.2 | Trace | 0.3 | 0.4 | 0.6 |
| $C_2H_4$ | | | | | | | | | 0.1 | | 0.1 | 0.1 | 0.1 |
| $C_2H_6$ | | | | | | | 0.5 | 0.7 | 1.6 | 1.8 | 1.0 | 1.2 | 0.9 |
| Estimated minimum $H_2O/C_1$ ratio at the indicated ethylene space velocity, based on rate of reactor pressure drop increase | | 7.0 | | 5.1 | | 4.9 | | 3.8 | [3] 2.5 | | 2.1 | | 2.4 |

[1] Operable.
[2] Inoperable.
[3] A slight decrease in steam/$C_1$ ratio caused reactor pressure drop, indicating the actual minimum steam/$C_1$ ratio to be slightly below 2.5.

Catalyst XVI

A 200 gram aliquot of the above commercial catalyst, designated as Catalyst B, was impregnated with an aqueous solution of sodium carbonate in an amount sufficient to yield 3.5 weight percent sodium salt, calculated as sodium metal, in the finished catalyst. The solution was prepared by dissolving 16.8 grams of sodium carbonate in 50 cc. of water. After thorough mixing, the mixture was dried overnight at 240° F., followed by calcination for 2 hours at 1000° F.

Catalyst XVII

A solution of sodium carbonate was prepared by adding 29.5 grams of sodium carbonate to 50 cc. of water, an additional 40 cc. of water and heating being necessary to obtain complete solution of the sodium carbonate. This solution was then added to a 200 gram aliquot Run numbers 26 and 27 of Table V above are based on the use of standard Catalyst B to which no alkali was added. In run number 26 no rise in reactor pressure drop was observable, indicating that the operating steam/$C_1$ ratio of 11.0 at an ethylene space velocity of 37 was an operable ratio, that is, a steam/$C_1$ ratio at which no observable carbon deposition was observed. On the other hand, in run number 27 a rapid rise in reactor pressure drop was observed at a steam/$C_1$ ratio of 5.7 at an ethylene space velocity of 60, indicating a rapid carbon lay down on the catalyst under these conditions. A correlation between minimum steam/$C_1$ ratios and ethylene space velocity for Catalyst B is shown by the straight line extrapolation of FIGURE 2 (labeled Catalyst B) and is based on an interpolation between the operable and inoperable steam/$C_1$ ratios of runs 26 and 27, adjusting for the rate of pressure drop rise. The remaining runs of Table V are based on the use of Catalysts XIII–

XVIII containing concentrations of sodium from 0.5 to 5.6 weight percent. In the case of Catalysts XIII, XIV, XV, XVII and XVIII, two runs are given in each instance, an operable (no observable rise in reactor pressure drop) and an inoperable (observable rise in reactor pressure drop). The operable runs show that the minimum $H_2O/C_1$ ratio is below the $H_2O/C_1$ ratio actually employed at the indicated space velocity of ethylene. On the other hand, the inoperable run (carbon deposition) shows that the minimum operable $H_2O/C_1$ ratio must be above the $H_2O/C_1$ ratio actually employed at the particular ethylene space velocity. Therefore, in each instance the minimum $H_2O/C_1$ ratio required to obtain carbon-free steam reforming ranges between the operable and inoperable $H_2O/C_1$ ratios indicated for each of the catalysts. In the case of Catalyst XVI, employed in run number 34, no rise in reactor pressure drop was observed at an $H_2O/C_1$ ratio of 2.5 and a space velocity of ethylene of 123. However, a slight decrease in the $H_2O/C_1$ ratio caused a rise in reactor pressure drop, indicating that the minimum $H_2O/C_1$ ratio was slightly below 2.5. Thus, for Catalyst XVI, the minimum $H_2O/C_1$ ratio at an ethylene space velocity of 123 is taken as 2.5. For the purpose of convenience, the results obtained in the runs of Table V are retabulated in Table VI, in which each of the alkalized catalysts is compared with standard Catalyst B at the same ethylene space velocity.

maximum reduction of the steam/$C_1$ ratio about 3 weight percent added alkali is required. Reductions in steam/$C_1$ ratio obtained with other feedstocks also agree with the curve shown in FIGURE 1 as illustrated by the data obtained with heptane given in Table I. As described above, the data of Table I are based on the use of a pre-activated commercial steam reforming catalyst similar to commercial Catalyst B. Run numbers 3 and 4 of Table I show that with Catalyst II, which contained about 3.2 weight percent added sodium, the operable and inoperable steam/$C_1$ ratios were 1.3 and 1.1, respectively. Since the minimum steam/$C_1$ ratio for standard commercial Catalyst I, used in runs 1 and 2 of Table I, is between 2.5 (inoperable) and 3 (operable), or about 2.7, the percent reduction in the steam/$C_1$ ratio achieved when using heptane at about 3.2 percent sodium is between 82 percent (based on the operable ratio) and 94 percent (based on the inoperable ratio). A plot of this range in the percent reduction of minimum steam/$C_1$ ratio is shown in FIGURE 1 by the line labeled "heptane," and shows that at an alkali concentration of about 3.2 percent, the percent reduction in minimum steam/$C_1$ ratios is at least 82 percent, which was also indicated for the ethylene-ethane feed. FIGURE 1 also shows that when the catalysts of this invention are used to steam reform a propylene-propane feed with a catalyst containing 5.6 percent alkali, the percent reduction in minimum steam/$C_1$ ratio is at TABLE VI.—CORRELATION OF PERCENT REDUCTION IN STEAM REQUIREMENTS WITH ALKALI CONCENTRATION

| | Concentration of Added Sodium (weight percent) | Operable | | Percent reduction in steam/$C_1$ ratio based on operable ratios | Inoperable | | Percent reduction in steam/$C_1$ ratio based on inoperable ratios | Range of percent reduction in steam/$C_1$ ratio (below inoperable and above operable) |
|---|---|---|---|---|---|---|---|---|
| | | Steam/$C_1$ ratio | Ethylene space Velocity | | Steam/$C_1$ ratio | Ethylene space Velocity | | |
| | (1) | (2) | (3) | (4) | (5) | (6) | (7) | (8) |
| Catalyst XIII | 0.5 | 6.3 | 63 | 16 | 5 | 81 | 51 | 16–51 |
| Catalyst B | 0 | 7.3 | 63 | | 9.1 | 81 | | |
| Catalyst XIV | 1.5 | 6.1 | 65 | 22 | 4.8 | 82 | 52 | 22–52 |
| Catalyst B | 0 | 7.5 | 65 | | 9.2 | 82 | | |
| Catalyst XV | 2.5 | 3.7 | 100 | 73 | 3.7 | 109 | 75 | 73–75 |
| Catalyst B | 0 | 11 | 100 | | 11.9 | 109 | | |
| Catalyst XVI | 3.5 | 2.5 | 123 | 88 | [1]2.5 | 123 | 88 | 88 |
| Catalyst B | 0 | 13.3 | 123 | | 13.3 | 123 | | |
| Catalyst XVII | 5.3 | 2.5 | 111 | 86 | 1.9 | 103 | 91 | 86–91 |
| Catalyst B | 0 | 12.1 | 111 | | 11.3 | 103 | | |
| Catalyst XVIII | 5.6 | 3 | 114 | 82 | 2.3 | 107 | 88 | 82–88 |
| Catalyst B | 0 | 12.4 | 114 | | 11.7 | 107 | | |

[1] A slight decrease in steam/$C_1$ ratio caused reactor pressure drop, indicating the actual minimum steam/$C_1$ ratio to be slightly below 2.5.

In Table VI, the operable steam/$C_1$ ratios given in column 2 at the ethylene space velocity given in column 3 for Catalysts XIII–XVIII are the experimental values shown in Table V. The inoperable steam/$C_1$ ratios in column 5 at the ethylene space velocities given in column 6 for Catalysts XIII–XVIII also are the experimental values set forth in Table V. In each instance, the corresponding operable and inoperable steam/$C_1$ ratios for standard Catalyst B are given at the same ethylene space velocity as determined by the straight line extrapolation of FIGURE 2 (line labeled "Catalyst B"). The percent reduction in the steam/$C_1$ ratios effected at the various concentrations of alkali in Catalysts XIII–XVIII are given in columns 4 and 7 of Table VI. The percent reduction in the steam/$C_1$ ratios of column 4 are based on the steam/$C_1$ ratios at which no observable carbon was deposited on the catalyst (operable). The percent reduction in steam/$C_1$ ratios of column 7 are based on the steam/$C_1$ ratios at which carbon was depositing or plugging the catalyst (inoperable). The range of percent reduction in steam/$C_1$ ratios are summarized in column 8 of Table VI, a plot of which is given in the accompanying FIGURE 1 correlating the percent reduction in the minimum steam/carbon ratios with alkali concentration. Inspection of FIGURE 1 shows that at an alkali concentration of about 2 weight percent, better than 60 percent reductions in minimum steam/carbon ratios are obtained and that for least 93 percent. The data on which the line labeled "propylene-propane" of FIGURE 1 is based are set forth in Table VII below.

Aging studies on Catalysts XIII–XVII in which the alkali concentration was varied indicated that the addition of sodium in excess of 1.5 weight percent as in Catalysts XVI and XVII resulted in a catalyst which retained its catalytic properties under adverse conditions. In these tests the catalysts were contacted with ethylene-ethane feed after they had been treated with steam at 1 atmosphere pressure and 1500° F. for various periods of time. Catalyst XVI to which 3.5 weight percent sodium was added resulted in good maintenance of the effect on reduction of steam requirements after treatment for 100 hours at 1500° F. with steam. Substantially no change in the initial minimum steam/$C_1$ ratio was observed when Catalyst XVII, containing 5.3 weight percent added sodium, was treated with steam at 1500° F. for 100 hours.

A series of runs was made using propylene-propane feed with conventional steam reforming catalyst, designated as Catalyst I above, and with Catalyst XVIII, containing 5.6 weight percent added sodium prepared as described above. These runs were conducted in the commercial bench scale unit described above in connection with the operating procedure employed in runs 1–5. The specific operating conditions employed and the results obtained are set forth in the following Table VII.

TABLE VII.—STEAM REFORMING OF PROPYLENE-PROPANE FEED

| | Run Number | | | | |
|---|---|---|---|---|---|
| | 39 | 40 | 41 | 42 | 43 |
| | Catalyst Number | | | | |
| | I | I | XVIII | XVIII | XVIII |
| | Feedstock | | | | |
| | 20 mol percent propylene/80 mol percent propane | | | | |
| Added Alkali | 0 | 0 | 5.6 weight percent sodium | | |
| Total On-Stream Hours Prior to Run | | | 282 | 480 | 514 |
| Operating Conditions: | | | | | |
| Reactor Inlet Temperature, °F | 650 | 665 | 980 | 940 | 895 |
| Reactor Outlet Temperature, °F | 1,450 | 1,445 | 1,395 | 1,437 | 1,456 |
| Reactor Outlet Pressure, p.s.i.g. | 126 | 124 | 125 | 225 | 125 |
| $C_1$ Space Velocity. s.c.f.h. $C_1$/cu. ft. Cat | 284 | 322 | 409 | 450 | 874 |
| Length of Run, hours | 12 | 12 | 10 | 4 | 6 |
| $H_2O/C_1$ ratio | 12.4 | 11.1 | 1.7 | 1.5 | 1.9 |
| Rate of Reactor Pressure (ΔP) Increase, Inches $H_2O$/hr | [1] 0.0 | [2] 0.38 | [1] 0 | [1] 0 | [1] 0 |
| Product Gas Distribution, Mol Percent: | | | | | |
| $H_2$ | 76.9 | 75.9 | 64.0 | 61.2 | 67.2 |
| CO | 4.3 | 5.9 | 17.9 | 15.0 | 17.5 |
| $CO_2$ | 18.2 | 18.1 | 9.4 | 10.5 | 9.0 |
| $CH_4$ | 0.1 | 0.1 | 8.7 | 13.3 | 6.3 |
| Minimum $H_2O/C_1$ ratio | [3] 11.7 | [3] 11.7 | ([4] [5]) | ([4] [6]) | ([4] [7]) |
| Percent Reduction in Minimum $H_2O/C_1$ ratio | | | | ([8]) | |

[1] Operable.
[2] Inoperable.
[3] This value is based on the average $H_2O/C_1$ ratios of Runs 39 and 40.
[4] Since no plugging of catalyst was observed at the indicated $H_2O/C_1$ ratio, the minimum ratio is below the actual operating $H_2O/C_1$ ratio employed in the experiment.
[5] 1.7 or less.
[6] 1.5 or less.
[7] 1.9 or less.
[8] At least 93%.

Comparison of the results obtained with Catalyst XVIII of this invention employed in runs 41, 42 and 43 of Table VII with standard Catalyst I used in runs 39 and 40, shows that the propylene-propane feed was converted to hydrogen-rich gas at a steam/carbon ratio which was at least 93 percent lower than the minimum required when using the standard catalyst, the standard catalyst requiring a steam/$C_1$ ratio of at least 11.7 to obtain carbon-free reforming of this olefinic feed, Catalyst XVIII requiring a minimum steam-carbon ratio which is less than 1.7. These data show the striking improvement in the steam reforming of difficultly reformed feeds such as propylene-propane, an available refinery stream, which is realized by the catalysts of this invention. The percent reduction (at least 93 percent) in minimum steam/carbon ratios achieved at an added sodium content of 5.6 weight percent using this propylene-propane feed, is shown in FIGURE 1 by the vertical line labeled "propylene-propane."

Additional catalysts of the present invention are the following Catalysts XIX and XX in which zirconia and chrome cement were used as the refractory materials. These catalysts were used to steam reform a feed containing 70 mol percent ethylene and 30 mol percent ethane at atmospheric pressure (15 p.s.i.a.) using the same type procedure described above in regard to the other runs involving this feed. The specific operating conditions employed and the results obtained are given in Table VIII.

Catalyst XIX

A solution of zirconium nitrate was prepared by dissolving 188 grams of $ZrO(NO_3)_2 \cdot 2H_2O$ in 2000 cc. of deionized water. A dilute solution of ammonium hydroxide (1000 cc.) prepared by adding 250 cc. of concentrated ammonium hydroxide to 2000 cc. of water was added to the zirconium salt solution with rapid stirring in increments of 100 cc. every two minutes until 1000 cc. were added. The final pH of the mixture was 9.25. The solution was stirred for an additional 15 minutes and then filtered. The filter cake was slurried twice for 15 minutes with 1 liter of water and filtered each time. The above steps were repeated, obtaining a second filter cake. The two filter cakes (1803 grams) were combined and an aqueous solution of nickel nitrate prepared by dissolving 240 grams of $Ni(NO_3)_2 \cdot 6H_2O$ in 40 cc. of water was added thereto with thorough mixing. An aqueous solution of sodium carbonate was prepared by dissolving 30 grams of sodium carbonate in 140 cc. of water, adding this solution to the nickel nitrate-filter cake mixture. The entire mixture was then blended until a smooth mixture was obtained. The mixture was then placed in an oven and dried at 240° F. for three days, calcined for 2 hours at 1000° F. and screened to 12/20 mesh. The 12/20 mesh catalyst was then steam-aged at 1500° F. for a total of 137 hours. The resultant catalyst contains about 3.5 weight percent sodium and about 20 weight percent nickel supported on zirconia.

Catalyst XX

A nickel nitrate solution was prepared by dissolving 507 grams of $Ni(NO_3)_2 \cdot 6H_2O$ in 1500 cc. of water. A solution of 300 grams of sodium carbonate in 2000 cc. of water was added to the nickel nitrate solution in increments of 100 cc. every two minutes with vigorous stirring until a pH of 9.0 was reached. The mixture was filtered, and the filter cake was washed three times by placing the cake in a beaker, adding 1 liter of water and stirring vigorously with a mechanical stirrer for 15 minutes. Enough water (50 cc.) was added to the washed filter cake to bring it to a proper consistency for blending in the refractory material. The refractory material employed was H. W. Chrome Castable Cement which, upon analysis, was shown to contain, on a weight basis: 6.8 percent silica; 31.2 percent alumina; 0.4 percent titania; 0.9 percent $Fe_2O_3$; 11.3 percent FeO; 5.9 percent calcium oxide; 15.8 percent magnesia; 26.7 percent chromic oxide; and zero percent alkali metals. 280 grams of this cement in powdered form was added to the nickel carbonate filter cake in small increments and blended in thoroughly. The resulting mixture was then spread to approximately one-half inch in thickness and, when sufficiently dry, was cut into cubes of about one-fourth to one-half inch and allowed to dry overnight at room temperature. These cubes were then dried in an oven at 240° F. for about 24 hours, followed by calcination for 2 hours at 1000° F. The cubes were broken up and 20-mesh material was pelleted. The pellets were then broken up and screened to 12/20 mesh. A 150 gram aliquot of this material (nickel supported on chrome cement) was impregnated with an aqueous solution of sodium carbonate prepared by dissolving 12.54 grams of sodium carbonate in 27 cc. of water, adding an additional 10 cc. of water to dissolve the sodium carbonate. After mixing thoroughly, the mixture was dried overnight at 240° F., followed by calcination for 2 hours at 1000° F. The catalyst contains about 20 weight percent nickel and about 3.5 percent sodium, calculated on the basis of the ingredients added.

TABLE VIII

| | Run Number | | | |
|---|---|---|---|---|
| | 44 | 45 | 46 | 47 |
| Catalyst Number | XIX | XIX | XX | XX |
| Feedstock | 70 mol percent ethylene/30 mol percent ethane | | | |
| Support | Zirconia | | Chrome cement | |
| Operating Conditions: | | | | |
| Catalyst Weight, grams | 123.4 | 123.4 | 128.2 | 128.2 |
| Reactor Temperature, °F., top | 1,249 | 1,247 | 1,168 | 1,165 |
| Reactor Temperature, °F., middle | 1,301 | 1,300 | 1,238 | 1,245 |
| Reactor Temperature, °F., bottom | 1,421 | 1,420 | 1,425 | 1,425 |
| Flow Rate, cc.: | | | | |
| Hydrocarbon/minute | 140 | 125 | 125 | 155 |
| $H_2O$/minute | 0.44 | 0.33 | 0.41 | 0.42 |
| Space Velocity, cc $C_1$/hr./cc. catalyst | 193 | 173 | 150 | 186 |
| $H_2O/C_1$ ratio | 2.1 | 1.7 | 2.2 | 1.8 |
| Run time, minutes | 120 | 59 | 120 | 120 |
| Rate of Reactor Pressure Drop ($\Delta P$) Increase, Inches $H_2O$/hr | [1]0 | [2]11.6 | [1]0 | [2]0.5 |
| Product Gas Analysis, Mol percent: | | | | |
| $H_2$ | 68.9 | 69.6 | 69.7 | 68.7 |
| CO | 16.8 | 22.2 | 14.7 | 18.8 |
| $CO_2$ | 11.6 | 6.0 | 12.6 | 9.7 |
| $CH_4$ | 0.3 | 0.6 | 0.2 | 0.1 |
| $C_2H_4$ | | | | |
| $C_2H_6$ | 2.4 | 1.6 | 2.8 | 2.7 |
| Minimum $H_2O/C_1$ ratio | | 2.1 | | 1.8+ |
| Space Velocity of Ethylene | | 121 | | 130 |
| Estimated Minimum $H_2O/C_1$ ratio for Catalyst B at about same ethylene space velocity [3] | | 13.1 | | 14 |
| Percent Reduction in Minimum Steam/$C_1$ ratio effected | | 90 | | 93 |

[1] Operable.
[2] Inoperable.
[3] Based on the correlation shown in Figure 1, line labeled "Catalyst B."

The data of Table VIII show that the alkalized nickel-zirconia catalyst (Catalyst XIX) effected steam reforming of the ethylene-ethane feed at a minimum steam/$C_1$ ratio of about 2.1 at a space velocity of ethylene of about 121. On the other hand, standard nickel Catalyst B requires a minimum steam/$C_1$ ratio of 13.1 at the same ethylene space velocity (121) as estimated from the straight line extrapolation of FIGURE 2 (line labeled Catalyst B). Thus, with Catalyst XIX, at an alkali concentration of about 3.5, the percent reduction and minimum steam/$C_1$ ratio which was effected is about 90 percent. Approximately the same percent reduction in steam/$C_1$ ratio was effected, using the alkalized nickel-chrome cement catalyst (Catalyst XX). It is noted that zirconia-based Catalyst XIX is a very stable catalyst as shown by the fact that, although it had been aged by treatment at 1500° F. for 137 hours with steam prior to use, it effected a 90 percent reduction in the minimum steam/carbon ratio.

It is well known that high molecular weight hydrocarbon oils are only difficulty converted to hydrogen-rich gas by steam reforming. It has been found that such high molecular weight hydrocarbon oils are successfully converted to hydrogen-rich gas in the presence of steam, using the catalysts of this invention, at steam/$C_1$ ratios which render the steam reforming of such oils commercially feasible. This is demonstrated by the use of the following Catalyst XXI to effect steam reforming of a paraffinic mineral oil having a molecular weight of 310. The test procedure employed was substantially the same as that described above in connection with runs 1–4. The specific operating conditions and results obtained are tabulated in the following Table IX. The inspections on the paraffinic mineral oil employed are as follows:

INSPECTION OF PARAFFINIC MINERAL OIL FEED

| | |
|---|---|
| API gravity | 39.7 |
| ASTM distillation: | |
| IBP | 530 |
| 5% | 564 |
| 10 | 577 |
| 20 | 594 |
| 30 | 605 |
| 40 | 616 |
| 50 | 630 |
| 60 | 645 |
| 70 | 662 |
| 80 | 681 |
| 90 | 707 |
| 95 | 726 |
| End point | 736 |
| Percent recovered | 98.5 |
| Percent residue | 1.5 |
| Weight percent sulfur, p.p.m. | <3 |
| Bromine number | 0.2 |
| Weight percent aromatics | 0.3 |
| Molecular weight | 310 |
| Assumed formula | $C_{22}H_{46}$ |

Catalyst XXI

A 500 gram aliquot of the same above-described preactivated commercial steam reforming catalyst, designated as Catalyst I, was calcined for 2 hours at 1000° F. and impregnated with an aqueous solution of 44 grams of sodium carbonate dissolved in 120 cc. of boiling water. After mixing thoroughly, the mixture was dried at 400° F. The above steps were repeated. The two batches of catalyst were then combined, calcined for 2 hours at 1000° F., and thoroughly mixed. Chemical analysis showed the catalyst to contain 3.0 weight percent sodium.

TABLE IX

Steam reforming of mineral oil (310 molecular weight)

| | |
|---|---|
| Run number | 48 |
| Catalyst number | XXI |
| Total on-stream hours prior to run | 114 |
| Operating conditions: | |
| Reactor inlet temperature, °F. | 700 |
| Reactor outlet temperature, °F. | 1225 |
| Outlet pressure, p.s.i.g. | 22 |
| $C_1$ space velocity, s.c.f.h. $C_1$/cu.ft. cat. | 133 |
| Length of run, hours | 12 |
| $H_2O/C_1$ ratio | 20 |
| Reactor $\Delta P$, inches of water: | |
| Start | 20.0 |
| Finish | 20.0 |
| Rate of increase, inches/hr. | 0.0 |
| Product gas analysis, mol percent: | |
| $H_2$ | 75.6 |
| CO | 2.5 |
| $CO_2$ | 21.9 |
| $CH_4$ | |
| Estimated minimum $H_2O/C_1$ ratio for Catalyst I (standard catalyst) [1] | 39 |

[1] Based on correlation of minimum steam/$C_1$ ratios and molecular weight of paraffinic hydrocarbons, a straight line relationship.

The data of Table IX show that with the catalysts of this invention the conversion of heavy oil was being effected at an operating steam/$C_1$ ratio of 20 without any observable pressure drop rise. Thus, the minimum steam/$C_1$ ratio is less than 20. On the other hand, with standard Catalyst I, the minimum steam/$C_1$ ratio is about 39.

Additional experiments using the catalysts of this invention were performed using catalysts prepared by the method illustrated by the preparation of the following Catalyst XXII. The results obtained with this catalyst using ethylene-ethane feedstocks at atmospheric pressure (15 p.s.i.a.) are tabulated in the following Table X, the data of which further show the superiority of the catalysts of this invention for steam reforming of olefinic feeds as compared with standard Catalyst B.

Catalyst XXII

A 25 gram aliquot of Catalyst B was soaked in 50 cc. of water for 2 hours at 180–200° F. The excess water was then decanted and the wet catalyst was placed on filter paper to absorb the balance of excess water. The water-soaked catalyst was then weighed to determine the weight of water absorbed (6.5 grams). Therefore, a 200 gram aliquot of Catalyst B would absorb 52 grams of water. Based on this determination, a 200 gram aliquot of Catalyst B was then soaked in 156 cc. of an aqueous solution containing 50.4 grams of sodium carbonate. The catalyst absorbs 52 grams of solution or 16.8 grams of sodium carbonate, which yields a finished catalyst containing about 3.5 weight percent sodium. The mixture was heated at 180–200° F. for 2 hours with occasional stirring, followed by decantation of excess liquid, placing the soaked catalyst on filter paper to absorb excess water. The catalyst was then heated at 240° F. overnight with occasional stirring, followed by calcination for 2 hours at 1000° F.

TABLE X

| | Run Number | |
|---|---|---|
| | 49 | 50 |
| | Catalyst Number | |
| | XXII | XXII |
| Feedstock | 70 mol percent ethylene/ 30 mol percent ethane | |
| Operating Conditions: | | |
| Catalyst Weight, grams | 107.3 | 107.3 |
| Reactor Temperature, ° F., top | 1,277 | 1,276 |
| Reactor Temperature, ° F., middle | 1,277 | 1,276 |
| Reactor Temperature, ° F., bottom | 1,423 | 1,422 |
| Flow Rate, cc.: | | |
| Hydrocarbon/minute | 134 | 113 |
| $H_2O$/minute | 0.43 | 0.29 |
| Space Velocity, cc. $C_1$/hr./cc. catalyst | 160 | 135 |
| $H_2O/C_1$, ratio | 2.2 | 1.7 |
| Run time, minutes | 120 | 35 |
| Rate of Reactor Pressure Drop ($\Delta P$) Increase, Inches $H_2O$/hr | [1] 0 | [2] 9.6 |
| Product Gas Analysis, Mol percent: | | |
| $H_2$ | 70.7 | 73.0 |
| CO | 17.3 | 20.6 |
| $CO_2$ | 10.9 | 5.7 |
| $CH_4$ | 0.1 | 0.3 |
| $C_2H_4$ | | |
| $C_2H_6$ | 1.0 | 0.5 |
| Minimum Steam/$C_1$ ratio | | 2.0 |
| Space Velocity of Ethylene, cc. $C_1$/hr./cc. cat | 112 | 95 |
| Minimum $H_2O/C_1$ ratio for Catalyst B at about same Space Velocity of Ethylene | | 10.4 |

[1] Operable.
[2] Inoperable.

The results obtained with Catalyst XXII prepared in accordance with the above so-called soaking techniques compares favorably with the results obtained with Catalyst XVI (refer to run number 34 of Table V) prepared by the so-called impregnation technique.

CATALYST XXIII

A 150 gram aliquot of standard Catalyst A, described above, was calcined for 2 hours at 1000° F. and then impregnated with an aqueous solution of potassium carbonate in an amount sufficient to yield 3.5 weight percent potassium in the finished catalyst. The solution was prepared by dissolving 12.8 grams of potassium carbonate in 55 cc. of water. After mixing thoroughly, the mixture was dried in an oven at 240° F., followed by calcination for 2 hours at 1000° F.

The alkalized catalysts of this invention also are unexpectedly effective and improved catalysts for the production of high B.t.u. Town's gas from hydrocarbon feedstocks at steam levels which are significantly lower than those required with conventional catalysts. For the production of Town's gas, temperatures between about 600 and about 1000° F. are suitable. For example, above Catalyst XXIII (71.7 grams) was used to convert propane to a high B.t.u. product, the operating conditions being: atmospheric pressure (15 p.s.i.a.); reactor temperature, top, middle and bottom: 835° F., 964° F. and 931° F., respectively; flow rate: 127 cc. propane/minute, 0.53 cc. steam/minute; space velocity: 228 cc. $C_1$/hour/cc. catalyst; steam/$C_1$ ratio: 1.9 and run time: 205 minutes. Under these conditions the rate of reactor pressure drop increase was zero inches water/hour. The product gas analysis showed it to contain, on a mol per cent basis: 56.5 $H_2$; 4.6 CO; 18.7 $CO_2$; 19.0 $CH_4$ and 1.2 $C_3H_8$, the B.t.u./s.c.f. value on a $C_3$ and $CO_2$-free basis being 486. Carbon-free reforming was also obtained at reactor temperatures of 779° F. (top), 860° F. (middle), and 836° F. (bottom) and a steam/$C_1$ ratio of 1.7. On the other hand, standard Catalyst A is inoperable at these temperatures (908° F. top, 1008° F. middle, 912° F. bottom) and an $H_2O/C_1$ ratio of 1.6 because of rapid deposition of coke on the catalyst, indicated by a rate of reactor pressure drop increase of 70 inches of steam/hour. Based on this rate of carbon lay down on the catalyst, the estimated minimum steam/$C_1$ ratio is approximately 3.8.

As apparent from the above, a markedly improved catalyst and process for the conversion of hydrocarbons, particularly hydrocarbons having a molecular weight above that of methane, to hydrogen and oxides of carbon is provided by the present invention. The process is operable at significantly lower levels of steam concentration than required with standard nickel steam reforming catalysts. The process is also applicable to the conversion of feedstocks which are at best only difficulty reformed even at high steam/carbon ratios in present day processes such as olefinic and normally liquid hydrocarbons and sulfur-containing feedstocks. The term alkaline metal compound as used herein is intended to include the alkali metal and alkaline earth metal compounds and, of these, the alkali metal compounds are preferred because of their vastly superior effect on reducing minimum steam requirements.

In accordance with the preferred embodiment of this invention, the steam reforming zone is charged with the catalyst to which an alkali metal salt has been added including salts of an oxide of carbon such as potassium, sodium and lithium carbonates and bicarbonates and mixtures thereof, and the alkali metal hydroxides, sodium carbonate and hydroxide being particularly effective. The reduction of minimum steam/carbon ratios becomes particularly marked at alkali metal contents of at least about 2 weight percent, maximum reduction (e.g., above 80 percent) being realized at concentrations of added alkali metal of at least 3 weight percent. It is to be understood that the term catalyst as employed herein is intended to include the contact mass as prepared and charged to the reaction zone, that is, for example, in the form of nickel or nickel oxide in combination with sodium carbonate and the difficulty reducible refractory support material, as well as any modified physical or chemical form to which the contact mass may be converted during the course of the steam reforming process. Mixtures of the alkaline metal compounds can also be employed. Hence the use of such mixtures is contemplated by and within the scope of this invention.

Various alterations and modifications of the catalysts and process of this invention may become apparent to those skilled in the art without departing from the scope of this invention.

Having described my invention, I claim:
1. A catalyst composition consisting essentially of between about 4 and about 40 weight percent nickel, at least 2 and less than 20 weight percent of an alkali metal compound, calculated as the metal, and a difficultly reducible refractory support consisting essentially of alumina, magnesia and calcium oxide.

2. A catalyst composition consisting essentially of between about 4 and about 40 weight percent nickel based on the total weight of the catalyst, at least 2 and less than 20 weight percent of an alkali metal compound, expressed as the alkali metal and based on the total weight of the catalyst, and a difficultly reducible refractory support consisting essentially of alumina in an amount from 11.0 to 69.2 weight percent, calcium oxide, in an amount from 4.1 to 19.0 weight percent, and magnesia in an amount from 1.2 to 9.9 weight percent, the said amounts of alumina, calcium oxide and magnesia being based on the total weight of the nickel and said refractory support.

3. The catalyst composition of claim 2 in which said alkali metal compound is a sodium compound.

4. The catalyst composition of claim 2 in which said alkali metal compound is a potassium compound.

5. The catalyst composition of claim 2 in which said alkali metal compound is a lithium compound.

6. The catalyst composition of claim 2 in which the alkali metal compound is an alkali metal carbonate.

7. The catalyst composition of claim 2 in which the alkali metal compound is an alkali metal hydroxide.

8. The catalyst composition of claim 2 in which the refractory material includes silica in an amount from 3.0 to 25.5 percent by weight of the total weight of nickel and said refractory support.

9. A catalyst composition consisting essentially of a nickel component selected from the group consisting of elemental nickel, nickel oxide and mixtures thereof, an alkali metal compound added to the catalyst as a compound selected from the group consisting of an alkali metal carbonate and an alkali metal hydroxide, in an amount sufficient to provide in the finished catalyst an alkali metal content of at least 3 and less than 20 percent by weight of the total weight of the catalyst, and a difficultly reducible refractory support consisting essentially of alumina in an amount from 11.0 to 69.2 weight percent, silica in an amount from 3.0 to 25.5 weight percent, calcium oxide in an amount from 4.1 to 19.0 weight percent and magnesia in an amount from 1.2 to 9.9 weight percent, the said amounts of alumina, silica, calcium oxide and magnesia being based on the total weight of the nickel component and refractory support, the content of said nickel component being from 16.0 to 32.0 weight percent, expressed as nickel oxide and based on the total weight of the nickel component and refractory support.

10. A method of preparing a catalyst composition which comprises applying an aqueous solution of an alkali metal compound to a composite of a compound of nickel and a difficultly reducible refractory support consisting essentially of alumina in combination with calcium oxide and magnesia, in an amount sufficient to provide at least about 2 and less than 20 weight percent alkali metal compound, expressed as the metal, in the finished catalyst, drying the composite and calcining the dried composite at an elevated temperature between about 800° F. and about 1700° F., said composite containing alumina in an amount from 11.0 to 69.2 weight percent, calcium oxide in an amount from 4.1 to 19.0 weight percent, and magnesia in an amount from 1.2 to 9.9 weight percent, the said amounts of alumina, calcium oxide and magnesia being based on the weight of said composite, and the compound of nickel being present in an amount sufficient to provide between about 4 and about 40 weight percent nickel in the finished catalyst.

11. The method of claim 10 in which said aqueous solution contains an alkali metal carbonate as the alkali metal compound.

12. The method of claim 10 in which said aqueous solution contains an alkali metal hydroxide as the alkali metal compound.

13. The method of claim 10 in which said difficultly reducible refractory support includes silica in an amount from 3.0 to 25.5 weight percent, based on the weight of said composite.

14. The method of claim 10 in which the calcined catalyst is further heat treated at a temperature from about 1700° F. to about 2000° F.

References Cited

UNITED STATES PATENTS

| | | | |
|---|---|---|---|
| 1,812,527 | 6/1931 | Gross et al. | 23—3 |
| 1,900,751 | 3/1933 | Baehr | 252—459 X |
| 1,943,821 | 1/1934 | Hanks et al. | 23—212 X |
| 2,056,911 | 10/1936 | Schiller et al. | 23—212 |
| 3,001,953 | 9/1961 | Reitmeier et al. | 252—455 |
| 3,047,630 | 7/1962 | Addy | 252—459 |
| 3,186,797 | 6/1965 | Pearce et al. | 23—212 |
| 2,038,566 | 4/1936 | Huettner et al. | 23—212 |
| 2,511,453 | 6/1950 | Barry | 252—466 X |
| 2,967,822 | 1/1961 | Moy et al. | 252—465 X |
| 2,991,255 | 7/1961 | Malley et al. | 252—455 X |
| 3,184,417 | 5/1965 | Hort | 252—474 |
| 3,186,957 | 6/1965 | Stiles | 252—466 |

OTHER REFERENCES

Innes: "Catalysis," vol. 1, 1954, edited by Paul Emmett, Reinhold Publishing Corp., pp. 245–248 and 267–273.

EDWARD J. MEROS, *Primary Examiner.*

U.S. Cl. X.R.

252—459, 466, 474; 23—212; 48—214

PO-1050
(5/69)

UNITED STATES PATENT OFFICE
CERTIFICATE OF CORRECTION

Patent No. 3,417,029  Dated December 17, 1968

Inventor(s) Joseph F. McMahon

It is certified that error appears in the above-identified patent and that said Letters Patent are hereby corrected as shown below:

Column 1, line 23, for "hydogen-rich" read --hydrogen-rich--. Column 2, line 2, for "nicket" read --nickel--. Column 3, line 44, after "prepared" strike out --as--. Column 6, line 23, for "hydrocarbone" read --hydrocarbons--; line 73, after "1200°F." insert --,--. Column 7, line 75, for "resitsance" read --resistance--. Column 9, Table I, second column, line 4 thereof, for "2" read --12--; same Table I, first column, line 5 thereof, for "p.s.i" read --p.s.i.g.--. Column 10, line 7, for "dmonstrates" read --demonstrates--. Columns 11 and 12, Table III, first column, line 14 thereof, for "Increases" read --Increase--. Columns 13 and 14, Table IV, first column, line 10 thereof, for "$C_1$/hr.cc.catalyst" read --$C_1$/hr./cc. catalyst--. Column 21, line 64, for "difficulty" read --difficultly--. Column 24, line 36, for "difficulty" read --difficultly--. Column 25, line 10, after "oxide" strike out --,--.

SIGNED AND
SEALED
JAN 5 1971

(SEAL)
Attest:

Edward M. Fletcher, Jr.
Attesting Officer

WILLIAM E. SCHUYLER, JR.
Commissioner of Patents